United States Patent [19]
Murakami et al.

[11] Patent Number: 5,998,018
[45] Date of Patent: Dec. 7, 1999

[54] COAT MASKING TAPE BASE MATERIAL, AND COAT MASKING TAPE

[75] Inventors: Masao Murakami, Tochigi; Kiichiron Haraguchi, Tokyo, both of Japan

[73] Assignee: Sony Chemicals Corp., Tokyo, Japan

[21] Appl. No.: 08/952,940

[22] PCT Filed: Apr. 3, 1997

[86] PCT No.: PCT/JP97/01152

§ 371 Date: Apr. 6, 1998

§ 102(e) Date: Apr. 6, 1998

[87] PCT Pub. No.: WO97/38059

PCT Pub. Date: Oct. 16, 1997

[30] Foreign Application Priority Data

Apr. 4, 1996 [JP] Japan ................................... 8-082233

[51] Int. Cl.⁶ ....................................................... B32B 7/12
[52] U.S. Cl. ......................... 428/343; 428/353; 428/354; 428/355 BL; 428/355 AC
[58] Field of Search ..................... 428/343, 353, 428/354, 355 BL, 355 AC

[56] References Cited

U.S. PATENT DOCUMENTS

| | | | |
|---|---|---|---|
| 4,844,979 | 7/1989 | Strobel et al. | 428/353 X |
| 5,374,482 | 12/1994 | Ozari et al. | 428/343 |
| 5,464,692 | 11/1995 | Huber | 428/343 |
| 5,654,055 | 8/1997 | Cox et al. | 428/354 X |

FOREIGN PATENT DOCUMENTS

| | | |
|---|---|---|
| 3-14885 | 1/1991 | Japan . |
| 3-42066 | 2/1991 | Japan . |
| 4-220479 | 8/1992 | Japan . |
| 6-220412 | 8/1994 | Japan . |
| 7-62311 | 3/1995 | Japan . |
| 8-73883 | 3/1996 | Japan . |
| 8-245938 | 9/1996 | Japan . |
| 9-20881 | 1/1997 | Japan . |

*Primary Examiner*—Daniel Zirker
*Attorney, Agent, or Firm*—Hill & Simpson

[57] ABSTRACT

A coat masking tape base material and a coat masking tape, having superior follow-up properties, promising sharp paint lines and being free of "left-on" when peeled, in which a polyolefin resin film having a modulus of elasticity of from 15 to 55 kgf/mm² has been subjected to modification treatment on its both sides, and a pressure-sensitive adhesive layer maintaining a thermoplastic saturated block copolymer, a thermoplastic unsaturated block copolymer and a tackifier or a cross-linked acrylic pressure-sensitive adhesive layer is formed on the film having been subjected to modification treatment.

29 Claims, 4 Drawing Sheets

COAT MASKING TAPE BASE MATERIAL, AND COAT MASKING TAPE

TECHNICAL FIELD

This invention relates to a masking tape used in coating (hereinafter "coat masking tape"), which can be peeled with ease, promise formation of nice paint lines and may cause no contamination on coating surfaces when the tape is peeled after coating materials having been spray-coated on vehicles, cars or the like are cured by baking, and can be stuck in a good operability (application operability).

BACKGROUND ART

Outer plates, bumpers and so forth of vehicles such as cars, buses and trains are coated in various color combinations and patterns in respect of functions and designs. In this coating, coat masking tapes are used in order to separate coat colors or protect portions which need not be coated.

As performances required in coat masking tapes, there are required, e.g., that the masking tape can be stuck in a good operability on curved surfaces of coating objects having complicated shapes, that paint lines after coat baking can be formed in a good precision, that coating materials can well adhere to the back of the masking tape, and that the masking tape can be peeled with ease (releasability at low temperature or high temperature).

As base materials for coat masking tapes, crepe paper, polyester film, soft vinyl chloride film, polyolefin resin film and so forth are used. As pressure-sensitive adhesive compositions used to form pressure-sensitive adhesive layers on such base materials for coat masking tapes, known compositions are, e.g., a composition constituted chiefly of natural rubber and added thereto a metal oxide, a tackifier and a vulcanization accelerator, and a composition constituted chiefly of natural rubber and a styrene-butadiene copolymer and added thereto a metal oxide, a tackifier, polyisobutylene, zinc oxide, heat-reactive phenol resin and so forth.

These conventional base materials for coat masking tapes, however, have the following problems. For example, the crepe paper has problems that an impregnating resin used to improve paper quality may exude under conditions of baking a coating material and come to the coating surface, the paper has no follow-up properties to the complicated curved surfaces, and no good paint lines can be formed. The polyester film has a problem that positions at which the masking tape can be applied are limited because of its poor follow-up properties to curved surfaces. The soft vinyl chloride film is advantageous as a base material having overcome the disadvantages of the crepe paper or polyester film, but has a problem that, when the coat masking tape is peeled at a relatively low temperature of from 5° C. to 10° C. after a coating material is coated and baked, the base material tends to break and its fragments scatter to tend to contaminate the coating objects. The polyolefin resin film has a problem that the adhesion of coating materials to the film is so poor that the coating materials may come off or the paint lines are not sharply formed.

Meanwhile, since the above known compositions used to form the pressure-sensitive adhesive layer are constituted chiefly of natural rubber, they have a problem of having an insufficient durability to heat. Hence, the part on which the masking tape is stuck tends to be contaminated after baking, to cause problems that final products have no sufficient stability, masking tapes do not well adhere in the winter or can not be well peeled after baking, and in some cases the pressure-sensitive adhesive layer may be left on the coating object when the tape is peeled.

The present invention aims at solving the above problems in the prior art. Accordingly, an object of the present invention is to provide a coat masking tape base material having superior follow-up properties, promising sharp paint lines and being free of "left-on" when peeled, and a coat masking tape making use of such a base material.

DISCLOSURE OF THE INVENTION

The present inventors made extensive studies to solve the above problems. As a result, they have discovered that a specific polyolefin resin film having been subjected to modification treatment is advantageous as a base material for coat masking tapes, and also that a coat masking tape that can achieve the above object can be obtained when a pressure-sensitive adhesive layer constituted of specific components is provided on such a base material, thus they have accomplished the present invention.

The present invention provides a coat masking tape base material comprising a polyolefin resin film having a modulus of elasticity of from 15 to 55 kgf/mm$^2$, and having been subjected to modification treatment on its both sides.

The present invention also provides a coat masking tape comprising;
  a coat masking tape base material comprising a polyolefin resin film having a modulus of elasticity of from 15 to 55 kgf/mm$^2$, and having been subjected to modification treatment on its both sides; and
  a pressure-sensitive adhesive layer formed on one side thereof, containing a thermoplastic saturated block copolymer, a thermoplastic unsaturated block copolymer and a tackifier, or a cross-linked acrylic pressure-sensitive adhesive layer.

BEST MODE FOR WORKING THE INVENTION

The coat masking tape base material and coat masking tape of the present invention will be described below in detail.

Figure 1:
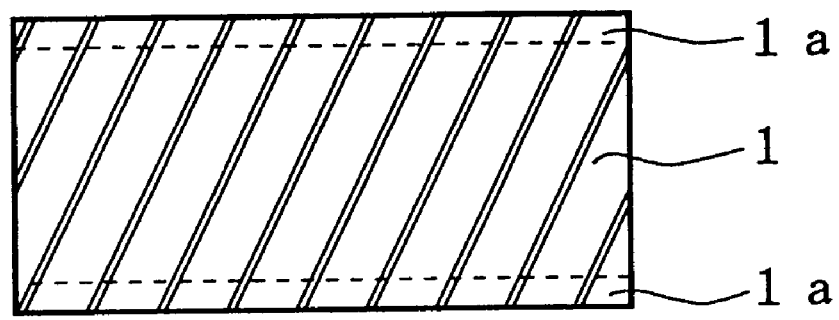
FIGS. 1 to 3 are each a cross-sectional view of a coat masking tape base material according to a preferred embodiment of the present invention.
Figure 2:
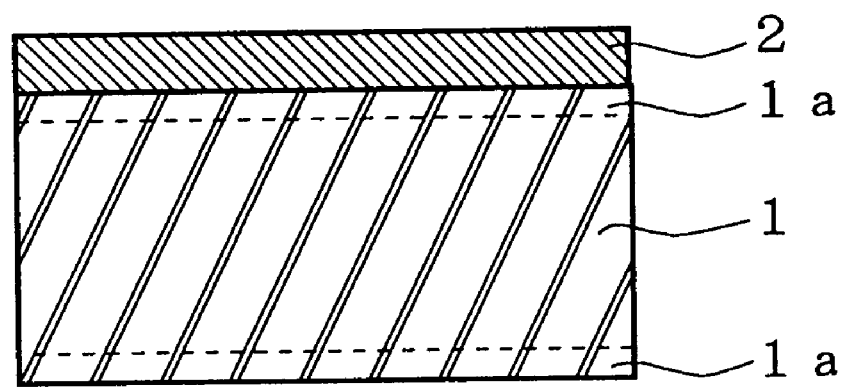

The coat masking tape base material of the present invention comprises a polyolefin resin film having a modulus of elasticity of from 15 to 55 kgf/mm$^2$, and has been subjected to modification treatment on its both sides. In a diagrammatic cross-sectional view, the base material has, as shown in FIG. 1, a structure wherein modification-treated regions 1a are formed on both sides of a polyolefin resin film 1. As a diagrammatic cross-sectional view of another embodiment, it may have, as shown in FIG. 2, a structure wherein a modified resin layer 2 is provided on one side of the polyolefin resin film 1 and a modification-treated region 1a is laid bare on the other side. A structure wherein modified resin layers 2 are formed on both sides of the polyolefin resin film 1 is also one of preferred embodiments of the coat masking tape base material of the present invention.

As the soft, polyolefin resin film 1 used in the coat masking tape base material of the present invention, a block copolymer of polypropylene (PP) with polyethylene (PE) or a random block copolymer of PP with PE may preferably be used. In particular, the block copolymer of PP with PE may particularly preferably be used.

The soft polyolefin resin film 1 may be incorporated with various compounding additives when the resin itself is formed into a film. For example, an antioxidant, a slip agent, a lubricant, an anti-blocking agent and so forth may be added. In some cases, these additives may adversely affect the coat masking tape base material. For example, the additives may bloom to the film surface with time, and such a film is not preferable as the coat masking tape base material. Accordingly, it is proper to keep from adding an organic slip agent or lubricant which tends to cause blooming.

In order to improve the follow-up properties of the coat masking tape to the coating surface, the polyolefin resin film 1 has a modulus of elasticity in the range of from 15 to 55 kgf/mm$^2$, and preferably from 20 to 50 kgf/mm$^2$. This is because the film may be too soft to be stuck in a good operability if the polyolefin resin film 1 has a modulus of elasticity not reaching 15 kgf/mm$^2$ and the follow-up properties may decrease if it is higher than 55 kgf/mm$^2$.

To measure the modulus of elasticity, the film is cut out in a size of 100 mm wide and 150 mm long to make measurement at a stress rate of 300 mm/minute according to JIS K 7127.

The polyolefin resin film 1 may preferably have a thickness of from 30 µm to 120 µm, and more preferably from 38 µm to 100 µm, because the film may be too soft if it is too thin and the modulus of elasticity can not reach the value within the above range to make the film difficult to handle and, if it is too thick, it has a modulus of elasticity higher than the above value to cause a decrease in follow-up properties.

Incidentally, the polyolefin resin film 1 has hard adhering properties because of its low surface energy. Accordingly, in the present invention, it is necessary to subject the polyolefin resin film 1 to modification treatment on its both sides to form the modification-treated regions 1*a* in order to make its surfaces readily adherent. The modification treatment may include electron-ray irradiation treatment, alkali-liquid treatment, flame treatment, ultraviolet-ray irradiation treatment, and corona treatment. In particular, corona treatment is preferred in view of economical advantages. The modification treatment by corona treatment or the like may be made under conditions appropriately set in accordance with the type of the polyolefin resin film.

The modification-treated regions 1*a* may have a difference in structure either macroscopic or microscopic, compared with the surfaces having not been subjected to modification treatment, but are significant in that they are distinctive from the viewpoint of surface adhesion.

In the present invention, the modified resin layer 2 (what is called a primer layer) may preferably be provided on at least one side of the polyolefin resin film 1 having been subjected to modification treatment. This modified resin layer 2 can improve adhesion to a resin coating material to be coated on the polyolefin resin film 1 having been subjected to corona treatment, can prevent the coating material from scattering when the masking tape is peeled after the coating material is baked, can improve the precision of paint lines, and can prevent corona treatment effect from lowering with time. The modified resin layer 2 may preferably be provided especially when the pressure-sensitive adhesive layer and the modification-treated region 1*a* on the surface of the polyolefin resin film 1 have a weak bonding power between them.

The modified resin layer 2 may preferably be non-adherent under conditions of storage so that coat masking tapes can be prevented from blocking under conditions of their storage.

As the modified resin constituting such a modified resin layer 2, a polyester type urethane resin, a polyether type urethane resin, an acrylic resin, a polyester resin or the like may be used. The modified resin layer may also preferably be further cross-linked by a cross-linking agent such as polyisocyanate or melamine, in order to improve its thermal resistance.

The modified resin layer 2 may preferably have a thickness of 20 µm or smaller, and more respectively 15 µm or smaller, per each side of the polyolefin resin film 1.

The modified resin layer 2 can be formed on the polyolefin resin film 1 by conventional means. For example, it can be formed by coating a modified resin layer forming composition by means of a gravure roll coater, a reverse roll coater or the like, followed by drying.

The modified resin layer 2 may also preferably be colored with a pigment, a dye, a filler or the like so that boundaries between an adherend and the coat masking tape can be distinguished with ease.

The polyolefin resin film 1 having been subjected to modification treatment may preferably be controlled to have a spreading tension (W) of 25 dyn/cm or higher as a value defined to be $\gamma \cos A$ when contact angle A of a standard liquid (JIS K 6768) having a surface tension ($\gamma$) of 35 dyn/cm on the surface of the film is determined. More specifically, it may preferably have a value in the range of from 25 to 35 dyn/cm. Such treatment brings about an improvement in adhesion to coating materials, so that the film can be preferably used as the coat masking tape base material. If it has a spreading tension lower than the above value, the coating material may separate from the back of the masking tape when the masking tape is peeled after baking, to contaminate the coating object.

With regard to the spreading tension (W), contact angle A is determined using a standard liquid prescribed in JIS K 6768 (a liquid mixture of 35% by volume of formaldehyde and 65% by volume of ethylene glycol monoethyl ether, having a surface tension of 35 dyn/cm), and the value W can be calculated according to the following.

$W = \gamma_L \cos A$ (room temperature: 23° C.±2° C.; humidity: 65±5%)

$\gamma_L$: 35 dyn/cm

The coat masking tape of the present invention will be described below.

Figure 3:
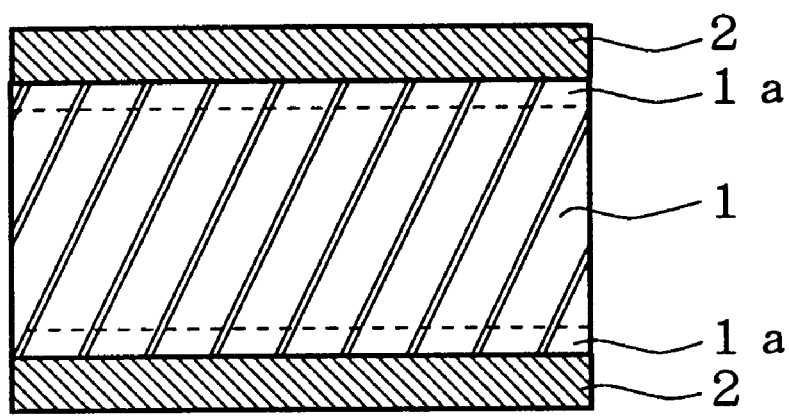
Figure 4:
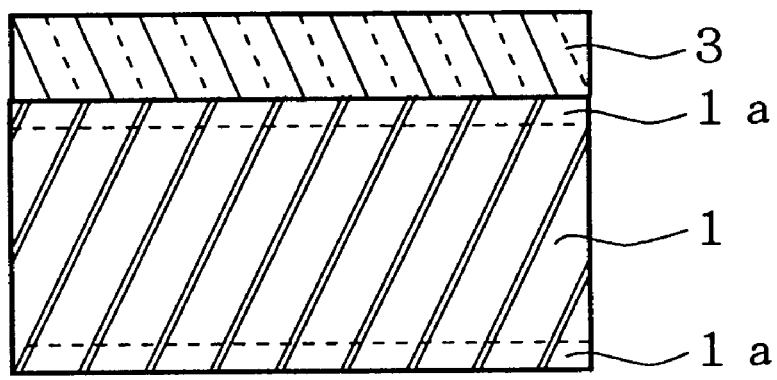
FIGS. 4 to 7 are each a cross-sectional view of a coat masking tape according to a preferred embodiment of the present invention.
Figure 5:
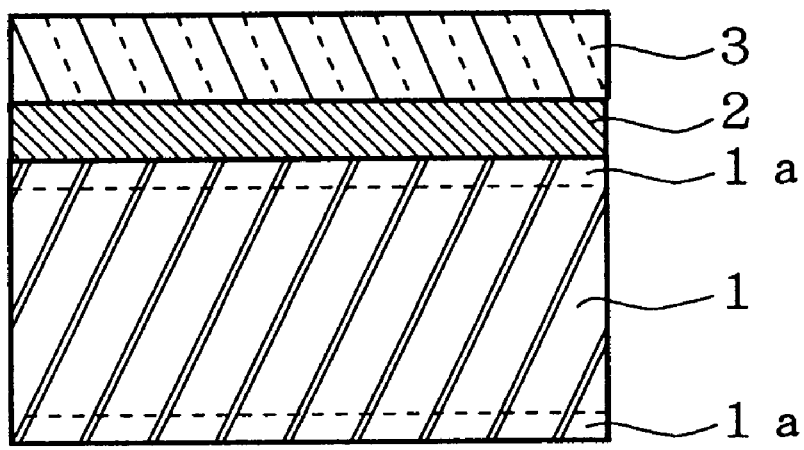
Figure 6:
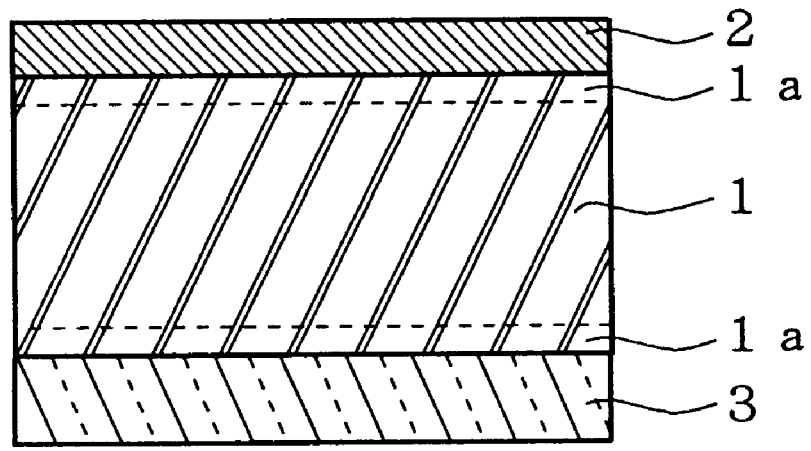
Figure 7:
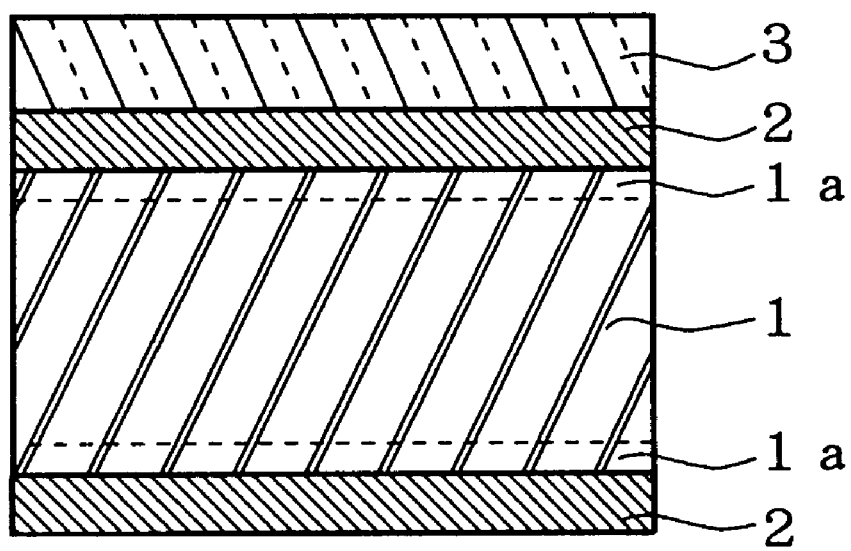

The coat masking tape of the present invention comprises the coat masking tape base material described above and a pressure-sensitive adhesive layer formed thereon. This masking tape may have a cross-sectional structure wherein, as shown in FIG. 4, a pressure-sensitive adhesive layer 3 is formed on one side of the coat masking tape base material shown in FIG. 1. As a diagrammatic cross-sectional view of another embodiment, the masking tape may have a structure wherein as shown in FIG. 5 or 6 the pressure-sensitive adhesive layer 3 is formed on the top surface or underside of the coat masking tape base material shown in FIG. 2, or may have a structure wherein as shown in FIG. 7 the pressure-sensitive adhesive layer 3 is formed on one side of the coat masking tape base material shown in FIG. 3.

The pressure-sensitive adhesive layer 3 may be a pressure-sensitive adhesive layer containing a thermoplastic saturated block copolymer, a thermoplastic unsaturated block copolymer and a tackifier, or a cross-linked acrylic pressure-sensitive adhesive layer.

The pressure-sensitive adhesive layer 3 may preferably have a thickness of from 8 µm to 70 µm, and more preferably from 10 µm to 60 µm, because tack, adhesion and fit may become poor if it is too thin and, if it is too thick, the coating material may invade into the pressure-sensitive adhesive to cause a decrease in paint line sharpness or the adhesion may be excessively high to lower releasability, resulting in a lowering of application operability and a decease in the precision of paint lines.

Here, as the thermoplastic saturated block copolymer, a block copolymer represented by the general formula: A-B-A (wherein A represents a styrene polymer block, and B represents a polymer block of ethylene with butylene) may preferably be used. For example, it may include G1657 (a straight-chain type comprised of 13% of the component A and 87% of the component B), G1652 (a straight-chain type comprised of 29% of the component A and 71% of the component B), G1726 (a straight-chain type comprised of 30% of the component A and 70% of the component B) (all available from Shell Chemical Co.) and so forth.

From the viewpoints of application operability at a low temperature and adhesive properties, the components A and B may be mixed in the thermoplastic saturated block copolymer in such a proportion that the component A is preferably not more than 40% by weight, and more preferably not more than 30% by weight, provided that the component A is not less than 5% by weight in order to impart a sufficient thermal resistance to the thermoplastic saturated block copolymer.

The thermoplastic saturated block copolymer described above has in itself no sufficient compatibility with the tackifier. However, the compatibility with the tackifier is improved and also low-temperature performance can be improved, when it is blended with a thermoplastic unsaturated block copolymer described below.

As the thermoplastic unsaturated block copolymer, a block copolymer represented by the general formula: A-C-A (wherein A represents a styrene polymer block, and C represents an isoprene polymer block) may preferably be used. For example, it may include TR1107 (a straight-chain type comprised of 14% of the component A and 86% of the component C), D1117 (a straight-chain type comprised of 17% of the component A and 83% of the component C), D1320 (a side-chain type comprised of 10% of the component A and 90% of the component C) (all available from Shell Chemical Co.) and so forth.

From the viewpoints of low-temperature operability and so forth, the components A and C may be mixed in the thermoplastic unsaturated block copolymer in such a proportion that the component A is preferably not more than 30% by weight, and more preferably not more than 20% by weight, provided that the component A is not less than 5% by weight in order to impart a sufficient thermal resistance to the thermoplastic unsaturated block copolymer.

The thermoplastic unsaturated block copolymer may preferably be mixed in an amount of from 0.5 to 30.0 parts by weight, and more preferably from 1.0 to 25.0 parts by weight, based on 100 parts by weight of the thermoplastic saturated block copolymer, in view of thermal resistance.

As the tackifier, a resin may be used which is compatible with the mixture of the above block copolymers, has a tackiness or adhesive properties, may cause no contamination on the adherend after baking and has a good releasability. Such a tackifier may include alicyclic hydrocarbon resins, aliphatic hydrocarbon resins, and hydrogenated terpene resins. As the alicyclic hydrocarbon resins, for example, P-70. P-80, P-90, P-100 and P-115 (all available from Arakawa Chemical Industries, Ltd.), ESKOLETS 5300 (available from Tohnex Co.) and the like may be used. As the aliphatic hydrocarbon resins, ESKOLETS 1401 (available from Tohnex Co.) and the like may be used. As the hydrogenated terpene resins, CLEARON P85 (available from Yasuhara Chemical Co., Ltd.) and the like may be used. The tackifier may preferably be mixed in an amount of from 40 to 200 parts by weight, and more preferably from 45 to 150 parts by weight, based on 100 parts by weight of the total weight of the thermoplastic saturated block copolymer and thermoplastic unsaturated block copolymer (rubber components).

In order to improve especially the durability to heat, the pressure-sensitive adhesive layer 3 may preferably be incorporated with an antioxidant including hindered phenols, as exemplified by IRGANOX 1010, IRGANOX 1076, IRGANOX 1035 (all available from Ciba-Geigy Corp.) and so forth. The antioxidant may preferably be mixed in an amount not more than 3 parts by weight, and more preferably not more than 2 parts by weight, based on 100 parts by weight of the rubber components.

In order to improve light-fastness of the pressure-sensitive adhesive layer 3, the layer may be incorporated with an ultraviolet light absorber. The ultraviolet light absorber may include, as a benzotriazole type, TINUVIN P, TINUVIN 571, TINUVIN 1130, TINUVIN 327 and, as a benzophenone type, TINUVIN 120 (all available from Ciba-Geigy Corp.). The ultraviolet light absorber may preferably be mixed in an amount not more than 3 parts by weight, and more preferably not more than 1 part by weight, based on 100 parts by weight of the rubber components.

In order to improve adhesive strength or tack, the pressure-sensitive adhesive layer 3 may be further mixed with a filler of various types. As effective fillers, organic type fillers and inorganic type fillers may be used. For example, polyolefin particles including EA209 and LE1080 (all available from Sumitomo Fine Chemical Co., Ltd.), silicon oxide including AEROSIL R972, R974, R200, R202, R300 and R380 (all available from Nippon Aerosil Co., Ltd.), titanium oxide, aluminum hydroxide, carbon black and so forth may be used. The filler may preferably be mixed in an amount not more than 15 parts by weight based on 100 parts by weight of the rubber components (thermoplastic saturated block copolymer and thermoplastic unsaturated block copolymer).

In instances where the coat masking tape base material is transparent, the pressure-sensitive adhesive layer may preferably be slightly colored. This enables simple and accurate distinction of boundaries between the masking tape and the adherend, and can greatly improve the application operability.

In place of the pressure-sensitive adhesive layer containing the thermoplastic saturated block copolymer, thermoplastic unsaturated block copolymer and tackifier as described above, a cross-linked acrylic pressure-sensitive adhesive layer having a good thermal resistance may be provided.

Acrylic pressure-sensitive adhesives used to constitute the acrylic pressure-sensitive adhesive layer may include polymer-polymer cross-linked products (e.g., carboxyl groups with epoxy groups, mutual condensation of methylol groups, and methylol groups with hydroxyl groups), and as other acrylic pressure-sensitive adhesives those obtained by cross-linking a polymer copolymerized with a monomer having active hydrogen such as carboxyl groups and hydroxyl groups, using an external cross-linking agent (e.g., a polyisocyanate, an aziridinyl group-containing compound, an etherified melamine resin and an organic metal compound; as exemplified by hexamethylenebisethyleneurea, diisopropoxyacetylacetonatotitanium, and butyl etherified melamine resin).

With regard to the amount of the cross-linking agent added in order to form a suitable cross-linked structure in the acrylic polymer by the use of the external cross-linking agent, if the cross-linking agent is added in a small amount, the pressure-sensitive adhesive may flow out and come to the coating object at a temperature set under conditions of baking to cause an increase in adhesive force, resulting in a poor releasability, so that the base material may break or the film may shrink to cause transfer of the pressure-sensitive adhesive to adhesive edges or result in a low precision of paint lines. If the cross-linking agent is added in a too large amount, the adhesion and tack may lower and the fit to coating objects and the follow-up properties to complicated surfaces may become poor, so that the solvent of the coating material may soak into the surfaces to cause a decrease in the precision of paint lines. Thus, the cross-linking agent may preferably be added in an amount, which may vary depending on the type of the cross-linking agent, of from 0.01 to 10 parts by weight, and more preferably from 0.05 to 7.0 parts by weight, based on 100 parts by weight of the acrylic polymer resin components.

In instances where the coating objects are molded products of a material having a low polarity such as polypropylene resin, the cross-linked acrylic pressure-sensitive adhesive layer may preferably be incorporated with a chlorinated polypropylene resin as an improver of adhesive force. This makes it possible to obtain a coat masking tape a for polypropylene resin products.

The chlorinated polypropylene resin may preferably include those having a functional group such as a carbonyl group or a hydroxyl group. Such a chlorinated polypropylene resin may include S206, S214 (all available from Nippon Seishi K.K.) and so forth. The chlorinated polypropylene resin may preferably be mixed in an amount of from 0.1 to 15 parts by weight, and more preferably from 0.2 to 10 parts by weight, based on 100 parts by weight of the resin content of the acrylic resin having a functional group.

The coat masking tape of the present invention can be produced by forming a pressure-sensitive adhesive layer forming composition into a layer on the coat masking tape base material by a conventional method. For example, it can be produced by directly coating on the coat masking tape base material a pressure-sensitive adhesive constituting the pressure-sensitive adhesive layer, or by laminating to the coat masking tape base material a pressure-sensitive adhesive layer once formed on a release film or release paper. The release film or release paper may be peeled when used.

In instances where, as the form of products, the release film is not provided and the coat masking tape is wound around itself on the back of the tape, it is preferable to provide a layer of a backing agent having a good coating material adhesive force, such as a urethane resin having a long-chain alkyl group.

EXAMPLES

The present invention will be described below in greater detail by giving Examples.

Examples 1 to 8 are examples in which the rubber type pressure-sensitive adhesive layer containing the thermoplastic saturated block copolymer, thermoplastic unsaturated block copolymer and tackifier, and Examples 9 and 10 are examples in which the cross-linked acrylic pressure-sensitive adhesive layer is used.

Examples 1 to 8, Comparative Examples 1 to 3

Coat masking tape base materials F1 to F6 were each prepared by subjecting the surface(s) of polyolefin resin film (as resins, PP-PE block copolymer, PP-PE random copolymer and PE were used; all available from Toyobo Co., Ltd.) having physical properties as shown in FIG. 1, to corona modification treatment and by providing a modified resin layer or layers (thickness: as shown in Table 1), in the manner as shown in Table 2 and described below. On each of these base materials, the pressure-sensitive adhesive layer (thickness: as shown in Table 1) was provided in the manner as described below.

(Corona modification treatment conditions)
Current: 1.05 A
Voltage: 4.7 kV
Rate of treatment: 180 m/min.

(Formation of modified resin layer)
On one side or both sides of the polyolefin resin film having been subjected to corona modification treatment, a modified resin layer forming composition PANACIA SP709 (white, containing polyisocyanate; available from Dainippon Ink & Chemicals, Incorporated) was coated in a thickness (dried-coating thickness) of from 4 to 7 $\mu$m to form the modified resin layer.

(Formation of pressure-sensitive adhesive layer)
First, mixtures formulated as shown in Table 3 were each dissolved in an n-hexane/toluene mixed solvent (1:4 in weight ratio) so as to be in a solid content of 34% by weight, to prepare a pressure-sensitive adhesive layer forming composition, which was then coated on one side of the polyolefin resin film having been subjected to modification treatment and provided with the modified resin layer(s), followed by drying for 3 minutes in an air circulation type heating oven set at 80° C. to form a rubber type pressure-sensitive adhesive layer. The layer thus formed was further post-cured at 50° C. for 20 hours to stabilize the bonding power between the modified polyolefin resin film and the pressure-sensitive adhesive layer. Thus, coat masking tapes of Examples 1 to 8 and Comparative Examples 1 to 3 were produced.

With regard to the spreading tension shown in Table 1, contact angle A was determined using a standard liquid prescribed in JIS K 6768 (a liquid mixture of 35% by volume of formaldehyde and 65% by volume of ethylene glycol monoethyl ether, having a surface tension of 35 dyn/cm), and the value was calculated according to the following.

W=$\gamma_L$cosA (room temperature: 23° C.±2° C.; humidity: 65±5%; $\gamma_L$: 35 dyn/cm)

The modulus of elasticity was measured according to JIS K 7127.

TABLE 1

Spreading Tension and Elasticity Modulus of Base Material

| Base material: | PP—PE block copolymer | PP—PE random copolymer | PE |
|---|---|---|---|
| Base material thickness ($\mu$m): | 70.0 | 38.0 | 60.0 |
| Modified resin layer thickness ($\mu$m): | 7.0 | 4.0 | 6.0 |
| Spreading tension*1: | | | |
| Untreated surface: | 21.5 | 21.2 | 22.0 |
| Corona-treated surfaces: | 31.9 | 30.8 | 32.4 |
| Modified resin layer side: | 32.4 | 32.4 | 32.4 |
| Modulus of elasticty*2: | | | |
| Untreated; MD*3: | 27.9 | 45.2 | 22.5 |
| TD*4: | 26.5 | 41.9 | 23.3 |

TABLE 1-continued

Spreading Tension and Elasticity Modulus of Base Material

| Base material: | PP—PE block copolymer | PP—PE random copolymer | PE |
|---|---|---|---|
| Modified resin layer, formed after corna treatment; | | | |
| MD*3: | 32.0 | 39.8 | 20.1 |
| TD*4: | 26.2 | 30.4 | 22.4 |

*1: Unit is dyn/cm
*2: Unit is kgf/mm2
*3: Length direction of the film
*4: Width directon of the film Remarks for Table 3:
(Rubber components)
Thermoplastic saturated block copolymer:
  G1657: available from Shell Chemical Co.
Thermoplastic unsaturated block copolymer:
  TR1107: available from Shell Chemical Co.
  D1320: available from Shell Chemical Co.
  FG1901: available from Shell Chemical Co.
Tackifier:
  P70: available from Arakawa Chemical Industries, Ltd.
  P90: available from Arakawa Chemical Industries, Ltd.
  P100: available from Arakawa Chemical Industries, Ltd.
  P115: available from Arakawa Chemical Industries, Ltd.
  CLEARON P85: available from Yasuhara Chemical Co., Ltd.

TABLE 2

Surface Treatment of Base Material

| Base material No. | Base material Composition | Thickness (µm) | Corona treatment | Modified resin layer Both sides | Modified resin layer One side | Pressure-sensitive adhesive layer, provided on: Corona = treated side | Pressure-sensitive adhesive layer, provided on: Modified = resin side |
|---|---|---|---|---|---|---|---|
| F1 | PP—PE block | 70 | Both sides | — | — | Formed | — |
| F2 | PP—PE block | 70 | Both sides | — | Formed | Formed | — |
| F3 | PP—PE random | 38 | Both sides | — | Formed | Formed | — |
| F4 | PE | 60 | Both sides | — | Formed | Formed | — |
| F5 | PP—PE block | 70 | Both sides | Formed | — | — | Formed |
| F6 | P—PE block | 70 | One side | — | Formed*5 | — | Formed |

*5: Modified resin was coated on the corona-treated surface.

TABLE 3

Formulation Of Synthetic Rubber Type Pressure-sensitive Adhesive
Unit: part(s) by weight

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Rubber components: | | | | | | | | | | | |
| G1657 | 90 | 90 | 81 | 90 | 90 | 90 | 99 | 77 | 100 | 60 | 90 |
| TR1107 | 10 | — | 9 | — | — | — | — | — | — | — | 10 |
| D1320 | — | 10 | — | 10 | 10 | 10 | 1 | 23 | — | 40 | — |
| FG1901 | — | — | 10 | — | — | — | — | — | — | — | — |
| (Sub total): | 100 | 100 | 100 | 100 | 100 | 100 | 100 | 100 | 100 | 100 | 100 |
| P70 | 36 | 40 | 36 | 36 | 36 | 137 | 50 | 40 | 45 | 40 | 36 |
| P90 | 14 | 15 | 14 | 14 | 14 | 14 | — | 14 | — | 14 | 14 |
| P100 | 35 | 39 | 35 | 35 | 35 | — | — | — | — | — | 35 |
| P115 | — | — | — | — | — | — | 40 | 40 | 40 | 40 | — |
| P85 | — | — | — | 15 | — | — | — | — | — | — | — |
| 5300 | — | — | — | — | 15 | — | — | — | — | — | — |
| Titanium oxide | — | 10 | — | — | — | — | — | — | — | — | — |
| 1010 | 1 | 1 | 1 | 1 | 1 | 1 | 1 | 1 | 1 | 1 | 1 |
| 1130 | 0.2 | 0.2 | 0.2 | 0.2 | 0.2 | 0.2 | 0.2 | 0.2 | 0.2 | 0.2 | 0.2 |
| LE1080 | 2.3 | 3.1 | 2.2 | 2.0 | 2.0 | 2.0 | 1.0 | 1.5 | 1.0 | 1.5 | 2.3 |

Remarks:
Compositions formulated as above were each dissolved in a hexane/toluene 1:3 mixed solvent, and prepared in a solid content of 34%.

ESKOLETS 5300: available from Esso Kagaku K.K.
Other additive components:
  Inorganic filler: titanium oxide
  Antioxidant: IRGANOX 1010, available from Ciba-Geigy Corp.
  UV absorber: TINUVIN 1130, available from Ciba-Geigy Corp.
  Organic filler: LE1080, available from Sumitomo Fine Chemical Co., Ltd.
(Evaluation)

The coat masking tapes thus obtained were examined on the following adhesion 1 (kgf/25 mm), retention (mm) at 40° C., adhesion 2 (kgf/25 mm), adhesion 3 (kgf/25 mm) after baking, anti-contamination, adhesive transfer, release 1, paint line precision, coating material adhesive properties, adhesion 4 (kgf/25 mm), release 2, release 3 and application operability in the following way to make evaluation. Results obtained are shown in Table 4.

Adhesion-1 Test

A test according to JIS Z 0237. The surface of a stainless steel sheet was polished with a #280 water-resistant polishing paper, and the coat masking tape was stuck on the polished surface with its pressure-sensitive adhesive layer side in contact. After a 2 kg roller was moved thereon forward and backward once, the resultant test piece was left to stand for 1 hour in an environment of 23° C. and 60% RH, and thereafter the tape was peeled in the direction of 180 degrees at a speed of 300 mm/min. by means of a tensile tester (TENSILON, manufactured by Orienteck Co.) to measure the force required to peel the tape (i.e., initial bond strength).

Adhesion-2 Test

The force required to peel the tape was measured in the same manner as in Adhesion-1 Test except that the stainless steel sheet polished with the #280 water-resistant polishing paper was replaced with a coated steed sheet obtained by coating the stainless steel sheet with a melamine/acrylate coating material followed by baking for 30 minutes in an air circulation type heating oven set at 150° C.

Adhesion-3 Test

The force required to peel the tape was measured in the same manner as in Adhesion-1 Test except that the test piece was heated at 140° C., for 30 minutes as if it was baked.

Adhesion-4 Test

The force required to peel the tape was measured in the same manner as in Adhesion-2 Test except that the test piece was heated at 140° C. for 30 minutes as if it was baked.

Test on retention and tack at 40° C.

Measured according to JIS Z 0237.

Anti-contamination Test

In Adhesion-4 Test, the test piece was visually observed whether or not its surface was contaminated when the tape was peeled. An instance where it was not contaminated was evaluated as "A"; and an instance where it was contaminated, Adhesive Transfer Test In Adhesion-4 Test, the test piece was visually observed whether or not the pressure-sensitive adhesive layer was left when the tape was peeled. An instance where it was not left was evaluated as "A"; and an instance where it was left, as Test on Release 1, 2, 3

The tape on the test piece used in Adhesion-4 Test was peeled at each temperature of 23° C. (release 1), 50° C. (release 2) and 10° C. (release 3). An instance where it was peelable with ease was evaluated as "A"; and an instance where it was not peelable with ease, as "C".

Paint Line Precision Test

In Adhesion-4 Test, the test piece was visually observed whether or not the boundary between a coated area and an uncoated areas was sharp when the tape was peeled. An instance where it was sharp was evaluated as "A"; and an instance where it was not sharp, as "C".

Coating Material Adhesive Properties Test

In Adhesion-4 Test, the test piece was visually observed whether or not the coating material scattered when the tape was peeled. An instance where the coating material did not scatter was evaluated as "A"; and an instance where the coating material scattered, as "C".

Application Operability Test

The same coated steel sheet as that used in Adhesion-4 Test was folded at 180 degrees by means of a rod of 2 mm diameter, and its surface was cleaned with isopropyl alcohol to prepare a test piece on which a test tape was to be stuck. The test tape and the test piece were kept stable in an environment of 10° C., where the test tape was stuck on the test piece from its flat portion so as to wrap around the 180-degree folded portion by 5 mm and thus bonded to the test piece. An instance where it was possible to stick the tape at 10° C. was evaluated as "A"; and an instance where it was impossible to do so, as "C".

TABLE 4

Performances of Masking Tapes with Synthetic Rubber Type Pressure-sensitive Adhesives

| | Example | | | | | | | | Comparative Example | | |
|---|---|---|---|---|---|---|---|---|---|---|---|
| Base material No.: | F3 | F1 | F2 | F4 | F5 | F2 | F2 | F2 | F2 | F2 | F6 |
| Initial performances: | 1 | 2 | 3 | 4 | 5 | 6 | 7 | 8 | 1 | 2 | 3 |
| Adhesion 1 | 0.63 | 1.18 | 0.42 | 0.78 | 0.84 | 2.92 | 1.53 | 1.44 | 0.25 | 1.50 | 1.20 |
| Retention*6 | 0 | 0 | 0 | 0 | 0 | 0 | 0 | 0 | 0 | 0 | 0 |
| Adhesion 2 | 0.80 | 0.95 | 0.90 | 0.80 | 0.85 | 2.15 | 1.40 | 1.00 | 2.10 | 1.00 | 0.90 |
| Performances after baking: | | | | | | | | | | | |
| Adhesion 3 | 0.70 | 1.10 | 2.90 | 1.10 | 0.70 | 1.75 | 1.50 | 1.25 | 1.40 | 1.60 | 1.00 |
| Anti-contamination | No | No | No | No | No | No | No | No | No | Yes | Yes |
| Adhesion transfer | No | No | No | No | No | No | No | No | No | Yes | Yes |
| Release 1 | A | A | A | A | A | A | A | A | A | A | A |
| Paint line precision | A | A | A | A | A | A | A | A | C | A | A |
| Coating material adhesive properties | A | A | A | A | A | A | A | A | A | A | C |
| Adhesion 4 | 1.00 | 0.78 | 0.70 | 1.00 | 1.20 | 1.20 | 1.30 | 1.05 | 1.35 | 1.40 | 0.80 |
| Release 2 | A | A | A | A | A | A | A | A | A | A | C |

TABLE 4-continued

Performances of Masking Tapes with Synthetic Rubber Type Pressure-sensitive Adhesives

| | Example | | | | | | | | Comparative Example | | |
|---|---|---|---|---|---|---|---|---|---|---|---|
| Base material No.: | F3 | F1 | F2 | F4 | F5 | F2 | F2 | F2 | F2 | F2 | F6 |
| Release 3 | A | A | A | A | A | A | A | A | A | C | C |
| Operability* | A | A | A | A | A | A | A | A | C | A | A |

*6: Retention at 40° C.
*7: Operability when the tape was stuck.

As shown in Table 4, the coat masking tapes of Examples 1 to 8 brought about good results in respect of initial performances and performances after baking.

On the other hand, in Comparative Example 1, unsatisfactory results were obtained in respect of the application operability and the paint line precision because the thermoplastic unsaturated block copolymer was not contained. In Comparative Example 2, unsatisfactory results were obtained in respect of the release at low temperature because the thermoplastic unsaturated block copolymer was contained in a too large quantity. In Comparative Example 3, unsatisfactory results were obtained in respect of the coating material adhesive properties because the polyolefin resin film was subjected to modification treatment on its one side.

Example 9

In 100 parts by weight of a solution (resin content: 30%) of a polymer constituted chiefly of butyl n-acrylate and containing a carboxyl group and an epoxy group as functional groups, 1.8 parts by weight of butyl etherified melamine resin (resin content: 50%) and 0.2 part by weight of di-nonyl-naphthalenesulfonic acid (a 55% isobutanol solution) were mixed to prepare an acrylic resin type pressure-sensitive adhesive composition. This solution was coated on the corona-treated surfaces of the coat masking tape base material F2 shown in Table 1, followed by drying to form a pressure-sensitive adhesive layer. Thus, a coat masking tape was obtained.

Example 10

In 100 parts by weight of the pressure-sensitive adhesive composition as used in Example 9, 1.0 part by weight of chlorinated PP (S206; resin content: 50%; available from Nippon Seishi K.K.) was mixed to prepare an acrylic resin type pressure-sensitive adhesive composition. A coat masking tape was produced in the same manner as in Example 9 except that this composition was used.

Comparative Example 4

A coat masking tape was produced in the same manner as in Example 9 except that a soft polyvinyl chloride resin film (thickness: 90 μm) was used as the coat masking tape base material.

Comparative Example 5

A coat masking tape was produced in the same manner as in Example 10 except that a soft polyvinyl chloride resin film (thickness: 90 μm) was used as the coat masking tape base material.

Comparative Example 6

76 parts by weight of natural rubber (a 20% solution; solvent: hexane/toluene 1:1), 12 parts by weight of rosin ester (available from Arakawa Chemical Industries, Ltd.) as a tackifier, 3 parts by weight of α-pinene polymer (available from Yasuhara Chemical Co., Ltd.) and 2 parts by weight of Nocceler (available from Ouchi-Shinko Chemical Industrial Co., Ltd.) were mixed with 7.0 parts by weight of toluene to prepare a pressure-sensitive adhesive composition, which was then coated on a soft polyvinyl chloride resin film (thickness: 90 μm) used as the coat masking tape base material, followed by drying to form a pressure-sensitive adhesive layer. Thus, a coat masking tape was obtained.

(Evaluation)

On the coat masking tapes of Examples 9 and 10 and Comparative Examples 4 to 6 thus obtained, evaluation was made in the same manner as in Example 1 to obtain the results as shown in Table 5. The following Adhesion-5 Test and Adhesion-6 Test were also made. Results obtained are shown in Table 5.

Adhesion-5 Test

A test was made in the same manner as in Adhesion-4 Test except that the stainless steel sheet was replaced with a PP molded sheet and its surface was cleaned with isopropyl alcohol.

Adhesion-6 Test

A test was made in the same manner as in Adhesion-5 Test except that the PP molded sheet was treated at 90° C. for 30 minutes and thereafter its surface was cleaned with isopropyl alcohol.

TABLE 5

Performances of Masking Tapes with Acrylic Resin Type Pressure-sensitive Adhesives

| | Example | | Comparative Example | | |
|---|---|---|---|---|---|
| Base material No.: | F2 | F2 | PVC | PVC | PVC |
| Initial performances: | | | | | |
| Adhesion 1 | 0.60 | 0.50 | 0.60 | 0.40 | 1.00 |
| Retention*6 | 0 | 0 | 0 | 0 | came off |
| Adhesion 2 | 0.50 | — | 0.55 | — | 1.55 |
| Adhesion 5 | — | 0.60 | — | 0.50 | — |
| Performances after baking: | | | | | |
| Adhesion 3 | 0.80 | — | 1.00 | — | 1.55 |
| Adhesion 4 | 0.90 | — | 1.20 | — | — |
| Adhesion 6 | — | 0.70 | — | 1.00 | 2.00 |
| Anti-contamination | A | A | A | A | C |
| Adhesion transfer | A | A | A | A | A |
| Paint line precision | A | A | A | A | A |
| Coating material adhesive properties | A | A | A | A | A |
| Release 1 | A | A | A | A | A |
| Release 2 | A | A | A | A | A |

TABLE 5-continued

Performances of
Masking Tapes with Acrylic Resin Type Pressure-sensitive Adhesives

|  | Example | | Comparative Example | | |
| --- | --- | --- | --- | --- | --- |
| Base material No.: | F2 | F2 | PVC | PVC | PVC |
| Release 3 | A | A | C | C | C |
| Operability*7 | A | A | B | B | C |

*6: Retention at 40° C.
*7: Operability when the tape was stuck.

As can be seen from Table 5, in Examples 9 and 10, desirable results were obtained on all evaluation items.

On the other hand, in Comparative Examples 4 to 6, unsatisfactory results were obtained in respect of the application operability and release at low temperature because the soft polyvinyl chloride resin film was used as the coat masking tape base material. Also, in Comparative Example 6, there was a problem in anti-contamination because the pressure-sensitive adhesive layer was constituted chiefly of natural rubber.

INDUSTRIAL APPLICABILITY

As described above, the coat masking tape of the present invention comprised of the specific coat masking tape base material and the specific pressure-sensitive adhesive layer in combination has the advantages that it has superior follow-up properties to adherend surfaces, can provide sharp paint lines and may cause less "left-on" when peeled. Hence, the coat masking tape of the present invention can be a masking tape suited for spray coating of vehicles, cars and so forth and coating in construction fields or usual homes.

We claim:

1. A coat masking tape base material comprising a polypropylene-polyethylene copolymer film having a modulus of elasticity of from 15 kgf/mm$^2$ to 55 kgf/mm$^2$, and having been subjected to adhesion modification treatment on both of its outer surfaces.

2. The coat masking tape base material according to claim 1, wherein the polypropylene-polyethylene copolymer film has a modulus of elasticity of from 20 kgf/mm$^2$ to 50 kgf/mm$^2$.

3. The coat masking tape base material according to claim 1, wherein the adhesion modification treatment is corona treatment.

4. The coat masking tape base material according to claim 1, wherein a modified resin layer is provided on at least one side of the polypropylene-polyethylene copolymer film having been subjected to modification treatment.

5. The coat masking tape base material according to claim 4, wherein said modified resin layer is selected from the group consisting of a polyester urethane resin, polyether urethane resin, an acrylic resin and a polyester resin.

6. The coat masking tape base material according to claim 4 or 5, wherein the modified resin layer is cross-linked with a cross-linking agent.

7. The coat masking tape base material according to claim 4, wherein the modified resin layer has a thickness of 20 μm or smaller.

8. The coat masking tape base material according to claim 1, wherein, when a standard liquid (JIS K 6768) having a surface tension of 35 dyn/cm to the polypropylene-polyethylene copolymer film having been subjected to adhesion modification treatment is represented by A, and spreading tension W (dyn/cm) of the polypropylene-polyethylene copolymer film having been subjected to adhesion modification treatment is defined by the following expression:
W=35cosA, and W is 25 dyn/cm or more.

9. The coat masking tape base material according to claim 1, wherein the polypropylene-polyethylene copolymer film comprises a polypropylene-polyethylene block copolymer.

10. The coat masking tape base material according to claim 1, wherein the polypropylene-polyethylene copolymer film has a thickness of from 30 μm to 120 μm.

11. A coat masking tape comprising:
a coat masking tape base material comprising a polypropylene-polyethylene copolymer film having a modulus of elasticity of from 15 kgf/mm$^2$ to 55 kgf/mm$^2$, and having been subjected to adhesion modification treatment on both of its outer surfaces; and
a pressure-sensitive adhesive layer formed on one side thereof, comprising:
(a) a mixture of a thermoplastic saturated block copolymer, a thermoplastic unsaturated block copolymer and a tackifier; or
(b) a cross-linked acrylic pressure-sensitive adhesive layer.

12. The coat masking tape according to claim 11, wherein the thermoplastic saturated block copolymer in the pressure-sensitive adhesive layer is a block copolymer represented by A-B-A, where A represents a styrene polymer block and B represents a polymer block of ethylene with butylene.

13. The coat masking tape according to claim 12, wherein the styrene block is contained in the thermoplastic saturated block copolymer in an amount of not more than 40% by weight.

14. The coat masking tape according to claim 11, wherein the thermoplastic unsaturated block copolymer in the pressure-sensitive adhesive layer is a block copolymer represented by A-C-A, where A represents a styrene polymer block and C represents an isoprene polymer block.

15. The coat masking tape according to claim 14, wherein the styrene block is contained in the thermoplastic unsaturated block copolymer in an amount of not more than 30% by weight.

16. The coat masking tape according to claim 11, wherein the pressure-sensitive adhesive layer contains the thermoplastic unsaturated block copolymer in an amount of from 0.5 part by weight to 30.0 parts by weight based on 100 parts by weight of the thermoplastic saturated block copolymer.

17. The coat masking tape according to claim 11, wherein the tackifier in the pressure-sensitive adhesive layer is selected from the group consisting of an alicyclic hydrocarbon resin, an aliphatic hydrocarbon resin and a hydrogenated terpene resin.

18. The coat masking tape according to claim 11, wherein the tackifier is in an amount of from 70 parts by weight to 200 parts by weight based on 100 parts by weight of the total weight of the thermoplastic saturated block copolymer and thermoplastic unsaturated block copolymer in the pressure-sensitive adhesive layer.

19. The coat masking tape according to claim 11, wherein the cross-linked acrylic pressure-sensitive adhesive layer contains a chlorinated polypropylene resin.

20. The coat masking tape according to claim 19, wherein the chlorinated polypropylene resin is contained in an amount of from 0.1 part by weight to 15 parts by weight based on the resin content of the cross-linked acrylic pressure-sensitive adhesive layer.

21. The coat masking tape according to claim 11, wherein the polypropylene-polyethylene copolymer film has a modulus of elasticity of from 20 kgf/mm$^2$ to 50 kgf/mm$^2$.

22. The coat masking tape according to claim 11, wherein the adhesion modification treatment is corona treatment.

23. The coat masking tape according to claim 11, wherein a modified resin layer is provided on at least one side of the polypropylene-polyethylene copolymer film having been subjected to modification treatment.

24. The coat masking tape according to claim 23, wherein said modified resin layer is selected from the group consisting of a polyester urethane resin, polyether urethane resin, an acrylic resin and a polyester resin.

25. The coat masking tape according to claim 23 or 24, wherein the modified resin layer is cross-linked with a cross-linking agent.

26. The coat masking tape according to claim 23, wherein the modified resin layer has a thickness of 20 μm or smaller.

27. The coat masking tape according to claim 11, wherein, when a standard liquid (JIS K 6768) having a surface tension of 35 dyn/cm to the polypropylene-polyethylene copolymer film having been subjected to adhesion modification treatment is represented by A, and spreading tension W (dyn/cm) of the polypropylene-polyethylene copolymer film having been subjected to adhesion modification treatment is defined by the following expression:

W=35cosA, and W is 25 dyn/cm or more.

28. The coat masking tape according to claim 11, wherein the polypropylene-polyethylene copolymer film comprises a polypropylene-polyethylene block copolymer.

29. The coat masking tape according to claim 11, wherein the polypropylene-polyethylene copolymer resin film has a thickness of from 30 μm to 120 μm.

* * * * *